(12) United States Patent
Hu

(10) Patent No.: US 8,259,159 B2
(45) Date of Patent: Sep. 4, 2012

(54) INTEGRATIVE SPECTACLE-SHAPED STEREOSCOPIC VIDEO MULTIMEDIA DEVICE

(76) Inventor: Chao Hu, Guangzhou (CN)

(*) Notice: Subject to any disclaimer, the term of this patent is extended or adjusted under 35 U.S.C. 154(b) by 856 days.

(21) Appl. No.: 12/351,903

(22) Filed: Jan. 12, 2009

(65) Prior Publication Data

US 2010/0177168 A1 Jul. 15, 2010

(51) Int. Cl.
*H04N 13/02* (2006.01)
(52) U.S. Cl. ......................................... 348/47
(58) Field of Classification Search .............. 348/47, 348/53
See application file for complete search history.

(56) References Cited

U.S. PATENT DOCUMENTS

| | | | |
|---|---|---|---|
| 6,177,952 B1* | 1/2001 | Tabata et al. | 348/47 |
| 6,236,428 B1* | 5/2001 | Fukushima | 348/42 |
| 6,816,132 B2* | 11/2004 | Tanijiri et al. | 345/7 |
| 2008/0198222 A1* | 8/2008 | Gowda | 348/62 |

* cited by examiner

*Primary Examiner* — Jerry Dennison

(57) ABSTRACT

An integrative spectacle-shaped stereoscopic video multimedia device includes a blinder and a video device disposed in the blinder. The video device includes two digital camera modules, an adjusting device for adjusting an axle distance and included angle between the digital camera modules, a binocular stereoscopic viewing module, a viewing module hole distance adjusting mechanism, sound pickups, loudspeakers, a memory, a plurality of analog/digital converters, a processor, a power source, and process control software coordinating the above members. The invention has advantages of a simple structure, a low cost, and a vivid stereoscopic effect, and is suitable for personal use.

17 Claims, 4 Drawing Sheets

INTEGRATIVE SPECTACLE-SHAPED STEREOSCOPIC VIDEO MULTIMEDIA DEVICE

BACKGROUND OF THE INVENTION

1. Field of Invention

The present invention relates to a multi-functional personal electronic device, and more particularly to an integrative spectacle-shaped stereoscopic video multimedia device for personal use.

2. Related Art

When viewing an object, two eyes of a human have a stereoscopic sense, because a distance between two pupils of the human eyes is approximately 6-7 cm. When the two eyes view an object, the viewing angles of the two eyes are not completely the same. Although the difference between the two eyes is slight, when it is transmitted to the brain through retinas, the brain has a sense of different distances based on the slight difference, thereby generating the stereoscopic sense. One eye can also see the object, but it is difficult to differentiate the farness and nearness and the distance of the object. According to this principle, for the same image, if two pictures with a slight angle difference are produced or shot by using the viewing angle difference of the two eyes, and then the two human eyes are made to respectively view the two pictures, the brain generates a stereoscopic image through the retinas. Currently, the principle is applied to various stereoscopic image demonstration techniques. However, the conventional stereoscopic image viewing devices have some disadvantages, for example, the technique is complicated, the cost is high, the image viewing effect is not ideal, so it is difficult to popularize and use the stereoscopic image viewing device as a personal product. As the electronic technology is developed, a multi-functional electronic product with communication, shooting, recording, displaying, and gaming functions is proposed, which is a revolution to the conventional electronic products. However, most of the electronic video products can display only the plane images, and few personal electronic devices through which the eyes may view high-quality stereoscopic images are available.

SUMMARY OF THE INVENTION

The present invention is directed to an integrative spectacle-shaped stereoscopic video multimedia device, which has a simple structure, a low cost, and a vivid stereoscopic effect, is convenient to use, is suitable for individual use, can record, store, play back, and download image and text signals, and can be used to play, view, and watch television programs.

The present invention provides an integrative spectacle-shaped stereoscopic video multimedia device, which includes a blinder 1 and a video device disposed in the blinder 1. The video device includes two digital camera modules 2, an adjusting device 3 for adjusting an axle distance and included angle between the digital camera modules, a binocular stereoscopic viewing module 4, a viewing module hole distance adjusting mechanism 5, sound pickups 6, loudspeakers 7, a memory 8, a signal interface 9, a plurality of analog/digital converters 10, a power source 30, a processor 11, and process control software 30.

The two digital camera modules 2 are used to shoot two image signals having a viewing angle difference.

The adjusting device 3 for adjusting an axle distance and included angle between the digital camera modules is used to mount the digital camera modules and adjust the axle distance and the included angle between the two digital camera modules.

The binocular stereoscopic viewing module 4 is composed of two stereoscopic displays, and the stereoscopic displays are used to perform view finding and to play and view stereoscopic images.

The viewing module hole distance adjusting mechanism 5 is used to adjust a distance between the displays of the binocular stereoscopic viewing module, so as to meet different demands for a hole distance of eyes.

The sound pickups 6 are used to pick up audio signals.

The loudspeakers 7 are used to play the audio signals.

The memory 8 is used to store electrical signals.

The signal interface 9 is used to realize an exchange with external signals.

The plurality of analog/digital converters 10 is correspondingly connected to the two digital camera modules 2, the binocular stereoscopic viewing module 4, the sound pickups 6, the loudspeakers 7, the memory 8, and the signal interface 9, and is used to convert the shot image signals, the picked audio signals, and the electrical signals input or output from the signal interface to analog/digital or digital/analog signals.

The power source 30 is used to supply power for the video device.

The processor 11 is respectively connected to the two digital camera modules 2, and is used to control the adjusting device 3 for adjusting an axle distance and included angle between the digital camera modules, the binocular stereoscopic viewing module 4, the sound pickups 6, the loudspeakers 7, the memory 8, the signal interface 9, the plurality of analog/digital converters 10, and the power source 30.

The process control software is used to coordinate and control the two digital camera modules 2, the adjusting device 3 for adjusting an axle distance and included angle between the digital camera modules, the binocular stereoscopic viewing module 4, the sound pickups 6, the loudspeakers 7, the memory 8, the signal interface 9, the analog/digital converters 10, the processor 11, and the power source 30, so as to synchronously control the two digital camera modules, to perform the view finding, tracking, and automatic focusing of a shooting target, and to shoot the images; the process control software 30 is further used to process and store the shot image signals, process the external signals exchanged by the signal interface, process the picked audio signals and the played audio signals, and finally play the images.

In the integrative spectacle-shaped stereoscopic video multimedia device, the two digital camera modules 2 include a left camera 200 and a right camera 201. The left camera 200 and the right camera 201 are disposed on the adjusting device 3 for adjusting an axle distance and included angle between the digital camera modules. The left camera 200 and the right camera 201 are respectively mounted on a left slide base 300 and a right slide base 301 of the adjusting device 3 for adjusting an axle distance and included angle between the digital camera modules, and the left slide base 300 and the right slide base 301 are disposed on a straight guide rail 302 at an interval. In order to adjust the axle distance between the two camera modules, a moving mechanism 303 matching the left slide base 300 and the right slide base 301 is disposed. A left rotating mechanism 304 and a right rotating mechanism 305 are respectively disposed on the left camera 200 and the right camera 201. The moving mechanism 3030 includes a moving motor 3030, a left driving screw 3031, and a right driving screw 3032. An output shaft of the moving motor 3030 is joined to the left driving screw 3031 and the right driving screw 3032. The left driving screw 3031 has a right-hand thread, and the right driving screw 3032 has a left-hand thread. The left driving screw 3031 and the right driving screw 3032 are respectively connected to the left slide base 300 and the right slide base 301 through the right-hand thread and the left-hand thread. A left screw hole 3043 is disposed on the left slide base 300, and the left driving screw 3031 matching the left screw hole 3043 controls the operation of the moving motor 4030 and controls the left slide base 300 to move on the straight guide rail 302, so as to adjust a distance between the left camera 200 and the right camera 201. The left rotating mechanism 304 is composed of a micro motor 3040 and a driving gear 3041 mounted on a power output shaft of the micro motor 3040. A left driving tooth 3042 is disposed on an edge of the left slide base 300. The driving gear 3041 is engaged with the left driving tooth 3042, and the micro motor 4040 controls an angle adjustment of the left camera 200, so as to adjust an included angle between axial lines of the left camera 200 and the right camera 201. Similarly, operations of the moving mechanism and the right rotating mechanism of the right camera 201 are the same as those of the left rotating mechanism. A linkage control key 306 of the moving mechanism 303, the left rotating mechanism 304, and the right rotating mechanism 305 is disposed on the blinder 1. The process control software 30 further includes software for coordinating the two digital camera modules 2 and the adjusting device 3 for adjusting an axle distance and included angle between the digital camera modules, so as to synchronously control the two digital camera modules, and to perform the view finding, tracking, and automatic focusing of the shooting target.

A left lens assembly 402 and a right lens assembly 403 capable of extending a virtual imaging distance are disposed between the two displays of the binocular stereoscopic viewing module 4 and human eyes.

In the integrative spectacle-shaped stereoscopic video multimedia device, the viewing module hole distance adjusting mechanism 5 includes a left eye frame 500 and a right eye frame 501, an adjusting knob 502, a left driving screw 503, and a right driving screw 504. The two stereoscopic displays of the binocular stereoscopic viewing module 4 are a left module 400 and a right module 401. The left module 400 and the right module 401 are respectively mounted on the left eye frame 500 and the right eye frame 501. A bevel gear 5020 on the adjusting knob 502 is engaged with a left screw bevel gear 5030 on the left driving screw 503 and a right screw bevel gear 5031 on the right driving screw 504. The left eye frame 500 and the right eye frame 501 are respectively engaged with the left driving screw 503 and the right driving screw 504 through a left thread hole base 5000 and a right thread hole base 5010 connected to the left eye frame 500 and the right eye frame 501. The adjusting knob 502 is adjusted to adjust a distance between the left eye frame 500 and the right eye frame 501.

In the integrative spectacle-shaped stereoscopic video multimedia device, a left lens slot 5001 and a right lens slot 5011 are respectively disposed on the left eye frame 500 and the right eye frame 501, such that according to different demands of users, spectacle lenses of corresponding diopters are inserted into the slots.

The integrative spectacle-shaped stereoscopic video multimedia device further includes a television program receiving unit 12. The television program receiving unit 12 forms a circuit connection with the binocular stereoscopic viewing module 4, the sound pickups 6, the loudspeakers 7, the memory 8, the signal interface 9, the plurality of analog/digital converters 10, and the processor 11. Television program keys 120 are disposed on the blinder 1. The process control software 2 further includes software for operating the television program receiving unit 12 and displaying the images.

In the integrative spectacle-shaped stereoscopic video multimedia device, the signal interface 9 includes one or more of an analog signal interface, a digital signal interface, an infrared interface, a Bluetooth interface, a wireless fidelity (WiFi) interface, and an Ethernet interface, and the process control software further includes software for matching the interfaces.

The integrative spectacle-shaped stereoscopic video multimedia device further includes a fill light 20, and the process control software further includes software for coordinating the two digital camera modules 2, the adjusting device 3, and the fill light 20 for adjusting an axle distance and included angle between the digital camera modules, so as to supplement light when the two digital camera modules automatically focus.

In the integrative spectacle-shaped stereoscopic video multimedia device, the memory 8 includes a memory expansion slot.

In the integrative spectacle-shaped stereoscopic video multimedia device, a left eye bracket 5002 and a right eye bracket 5012 are respectively disposed on the left eye frame 500 and the right eye frame 501.

In the present invention, as the above structure is adopted, the images displayed in the two displays may be viewed through the two naked eyes at the same time. Thus, by respectively playing synchronous images with the viewing angle difference adapted to the human eyes on the two displays, virtual images viewed by the two eyes through oculars are sent to the brain to generate a stereoscopic image with the far and near levels. In the present invention, complicated image processing techniques or expensive display panels are not required, the structure is simple, the cost is low, and the viewed display images have a vivid stereoscopic effect. As the means for achieving the stereoscopic effect is simple and convenient, it is possible to shoot and view video content at the same time, and to download and play external image signals and television signals, thereby providing a new multifunctional personal electronic device for consumers.

BRIEF DESCRIPTION OF THE DRAWINGS

The present invention will become more fully understood from the detailed description given herein below for illustration only, and thus are not limitative of the present invention, and wherein.

DETAILED DESCRIPTION OF THE INVENTION

A detailed description of the present invention is given below with reference to the accompanying drawings, which, however, does not limit the present invention.

Figure 1:
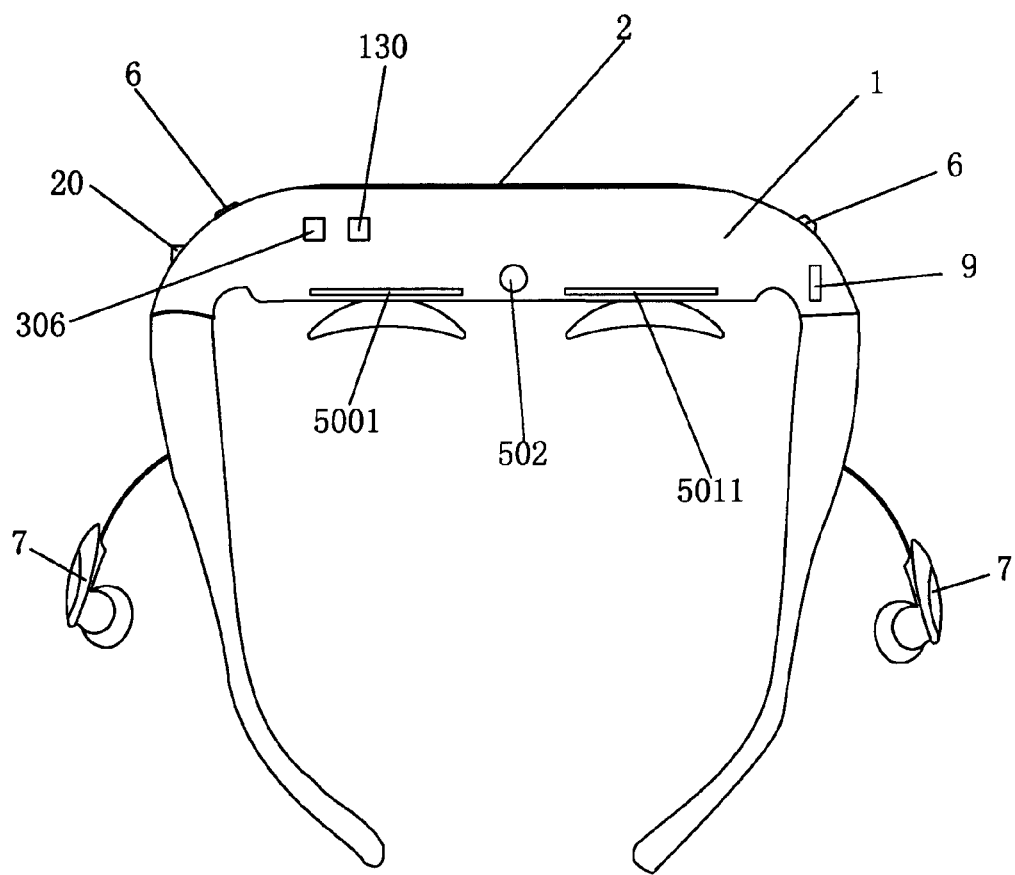
FIG. 1 is a schematic structural view of the present invention.
Figure 2:
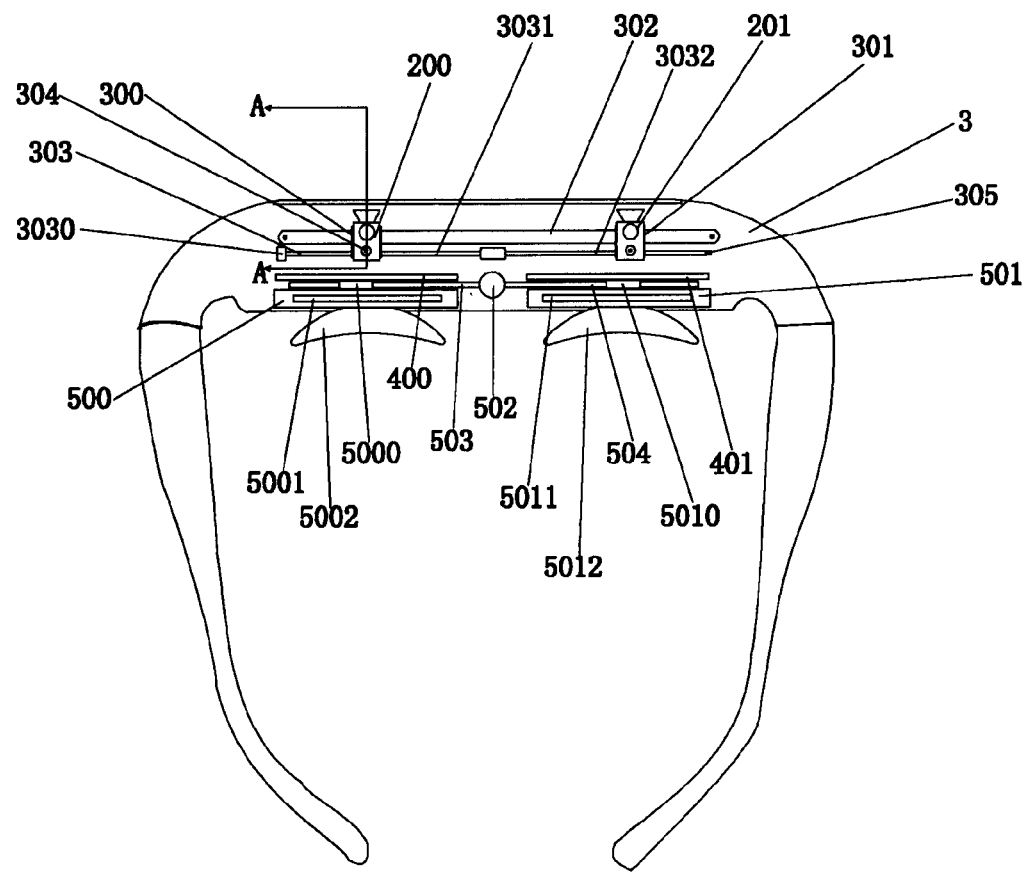
FIG. 2 is a schematic internal structural view of the present invention.
Figure 3:
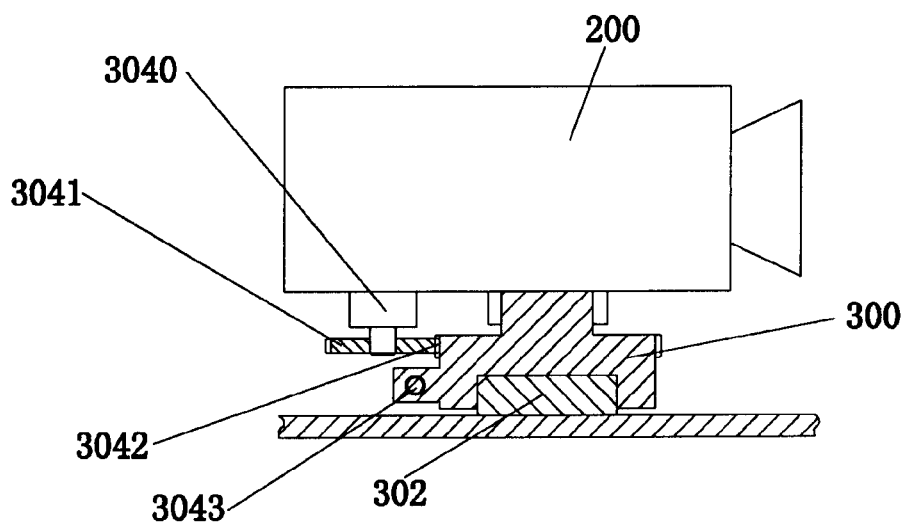
FIG. 3 is a partial cross-sectional view taken along A-A of FIG. 2.
Figure 4:
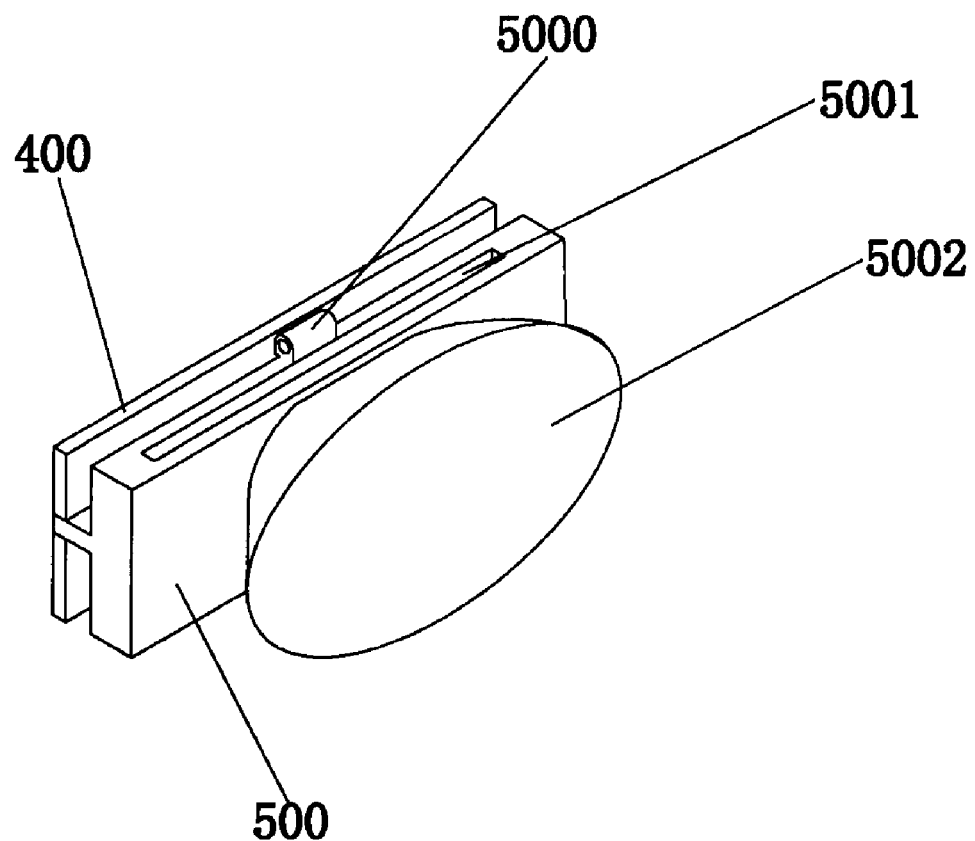
FIG. 4 is a schematic three-dimensional structural view of a viewing module hole distance adjusting mechanism of the present invention.
Figure 5:
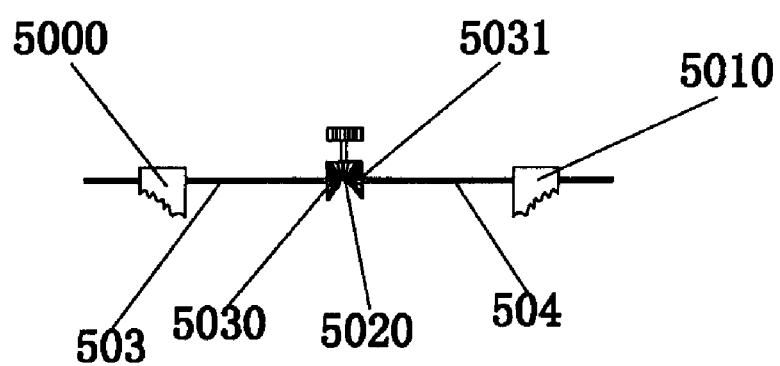
FIG. 5 is a schematic view of a connection structure of the viewing module hole distance adjusting mechanism of the present invention.
Figure 6:
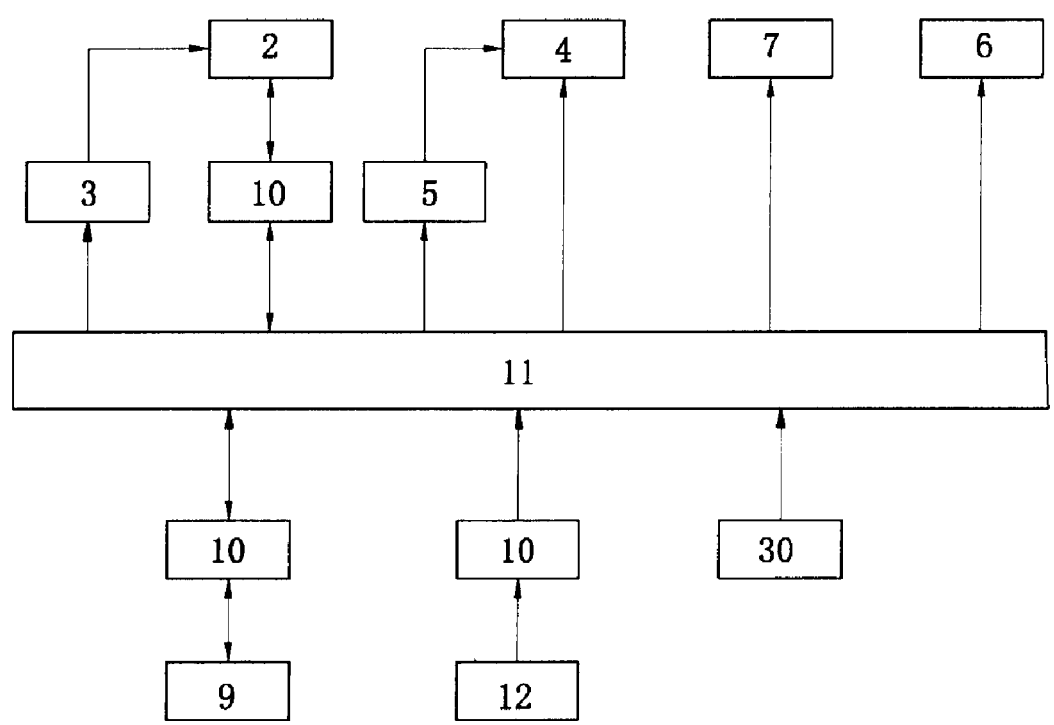
FIG. 6 is a circuit block diagram of the principle of the present invention.

Referring to FIGS. 1 to 6, an integrative spectacle-shaped stereoscopic video multimedia device includes a blinder 1, and a signal interface 9, a power source 30 jack, television program keys 120, a linkage control key 306, a fill light 20, a left lens slot 5001, a right lens slot 5011, and an adjusting knob 502 are disposed on the blinder 1. Sound pickups 6 and loudspeakers 7 are respectively disposed on a left side and a right side of the blinder 1, so as to generate a stereoscopic effect. A video device is disposed in the blinder 1, the video device includes two digital camera modules 2, an adjusting device 3 for adjusting an axle distance and included angle between the digital camera modules, a binocular stereoscopic viewing module 4, a viewing module hole distance adjusting mechanism 5, sound pickups 6, loudspeakers 7, a memory 8, a plurality of analog/digital converters 10, a processor 11, a power source 30, and process control software for coordinating the above members.

A left module 400 and a right module 401 forming the binocular stereoscopic viewing module 4 of the present invention are respectively disposed on a left eye frame 500 and a right eye frame 501. The left module 400 and the right module 401 adopt lens assemblies having a magnification function and capable of zooming out a virtual imaging distance.

In the present invention, a viewing module hole distance adjusting mechanism 5 is further disposed, the adjusting knob 502 may adjust a distance between the left eye frame 500 and the right eye frame 501, so as to meet different hole distance demands of human eyes.

Shooting and viewing images of the present invention: the linkage control knob 306 is operated, under an instruction of the control software of the adjusting device 3 for adjusting an axle distance and included angle between the digital camera modules, the two digital camera modules 2 are synchronous controlled to perform the view finding, tracking, and automatic focusing of a shooting target, and to respectively shoot the images. The digital camera modules respectively convert analog image signals to digital image signals through the analog/digital converters. The digital image signals are stored in the memory 8, and the digital image signals may share the same memory or be stored in different memories. Similarly, audio signals obtained by the sound pickups 6 are converted to digital audio signals through the analog/digital converters, and the digital audio signals are stored in the memory 8. The stored different digital image signals are respectively displayed on the left module 400 and the right module 401 in the binocular stereoscopic viewing module 4. The two eyes view the synchronous images with the viewing angle difference adapted to the human eyes respectively displayed by the left module 400 and the right module 401 through the left eye bracket 5002 and the right eye bracket 5012, so as to form a stereoscopic image of a scene.

Viewing external signals: in the present invention, image signals input from the signal interface 9 may be viewed. In the image signals input from the signal interface 9, the analog image signals are converted to the digital image signals through the analog/digital converters, and the digital image signals are stored in the memory 8. If the image signals input from the signal interface 9 are digital image signals, the digital image signals are directly stored in the memory 8. Then, through the signal processing software, the two image signals with the viewing angle difference are respectively displayed by the left module 400 and the right module 401, the two human eyes view the synchronous images with the viewing angle difference adapted to the human eyes respectively displayed by the left module 400 and the right module 401 through the left eye bracket 5002 and the right eye bracket 5012, so as to form the stereoscopic image of the scene. If the signals input from the signal interface 9 are the analog signals, the analog image signals are converted to the digital image signals through the analog/digital converters, and the digital image signals are stored in the memory 8. Then, through the signal processing software, the two image signals with the viewing angle difference are respectively displayed by the left module 400 and the right module 401, and the two human eyes view the synchronous images with the viewing angle difference adapted to the human eyes respectively displayed by the left module 400 and the right module 401 through the left eye bracket 5002 and the right eye bracket 5012, so as to form the stereoscopic image of the scene.

In the present invention, television programs may also be viewed. The television program keys 120 are operated, under the control of the software for operating the television program receiving unit 12 and displaying the images, the television program receiving unit 12 receives television signals, the analog image signals are converted to the digital image signals through the analog/digital converter, and the digital image signals are stored in the memory 8. Then, through the signal processing software, the two image signals with the viewing angle difference are respectively displayed by the left module 400 and the right module 401, the two human eyes view the synchronous images with the viewing angle difference adapted to the human eyes respectively displayed by the left module 400 and the right module 401 through the left eye bracket 5002 and the right eye bracket 5012, so as to form the stereoscopic image of the scene.

The signal interface 9 of the present invention may be one or more of an analog signal interface, a digital signal interface, an infrared interface, a Bluetooth interface, a wireless fidelity (WiFi) interface, and an Ethernet interface. The memory 8 of the present invention includes a program memory, an address memory, or a buffer. The signal interface, the memory, and the analog/digital converters of the present invention may be shared.

The power source 30 of the present invention may be one of or both of a built-in power source and an external power source.

The loudspeakers 7 of the present invention may be speakers or earphones. In order to generate the stereoscopic effect, two or more loudspeakers 7 may be used.

In actual applications, the present invention may be not only used as a stereoscopic image player, a stereoscopic image shooting and storing device, a stereoscopic image shooting monitor, and a mobile television set, but also as a stereoscopic game console, an Internet stereoscopic image display, a music player, and a sound recorder and the like. Thus, the present invention provides a new portable personal entertainment and business electronic device for consumers.

What is claimed is:

1. An integrative spectacle-shaped stereoscopic video multimedia device comprising a spectacle-shaped blinder and a video device disposed in the blinder, wherein the video device further comprises:

two digital camera modules disposed in the blinder and each further comprising a camera and a rotating mechanism respectively for shooting two image signals having a viewing angle difference, wherein the rotating mechanism is disposed on the respective camera;

an adjusting device further comprising a straight guide rail, two slide bases disposed on the straight guide rail and joined to the cameras, and a moving mechanism matching the slide bases for mounting the digital camera modules and adjusting an axle distance and an included angle between the two digital camera modules;

a binocular stereoscopic viewing module further comprising a left module and a right module and disposed next to the moving mechanism to perform a view finding and playing and viewing stereoscopic images;

a viewing module hole distance adjusting mechanism further comprising two eye frames mounting with the left and right modules respectively, an adjusting knob disposed between the two eye frames for adjusting a distance between displays of the binocular stereoscopic viewing module, so as to meet different hole distance demands of eyes;

two sound pickups disposed at lateral sides of the digital camera modules respectively for picking up audio signals generated by the video device;

two loudspeakers disposed at lateral sides of the blinder respectively for playing the audio signals;

a memory disposed in the blinder for storing electrical signals generated by the video device;

a signal interface disposed at a lateral side of the blinder for realizing an exchange with external signals;

a plurality of analog/digital converters disposed in the blinder and correspondingly connected to the two digital camera modules, the binocular stereoscopic viewing module, the sound pickups, the loudspeakers, the memory, and the signal interface for converting the two shot image signals, the picked audio signals, and the electrical signals passing through the signal interface to analog signals or digital signals;

a power source disposed in the blinder for supplying power for the video device;

a processor with process control software disposed in the blinder and respectively connected to the two digital camera modules for controlling the adjusting device, the binocular stereoscopic viewing module, the sound pickups, the loudspeakers, the memory, the signal interface, the analog/digital converters, and the power source;

whereby, view finding, tracking, and automatic focusing of a shooting target are performed, the images are shot, processed and stored, the external signals are exchanged, the audio signals are picked and played, and finally the images are played.

2. The integrative spectacle-shaped stereoscopic video multimedia device according to claim 1, wherein the moving mechanism further comprises a moving motor with an output shaft, a left driving screw, and a right driving screw; the output shaft of the moving motor is joined to the two driving screws and the driving screws are respectively connected to the slide bases; one of the slide bases has a screw hole to match the left driving screw to allow the moving motor to move said slide base to move on the straight guide rail to adjust a distance between the cameras; the respective rotating mechanism is composed of a micro motor with a power output shaft, a driving gear installed on the power output shaft, and a driving tooth is disposed on an edge of the respective slide base to engage with the driving gear for the micro motor controlling an angle adjustment of the respective camera adjusting the included angle between the camera modules.

3. The integrative spectacle-shaped stereoscopic video multimedia device according to claim 1, wherein the binocular stereoscopic viewing module is capable of extending a virtual imaging distance.

4. The integrative spectacle-shaped stereoscopic video multimedia device according to claim 2, wherein the binocular stereoscopic viewing module is capable of extending a virtual imaging distance.

5. The integrative spectacle-shaped stereoscopic video multimedia device according to claim 1, wherein the viewing module hole distance adjusting mechanism further comprises two driving screws engaging with the eye frames respectively, a bevel gear disposed on the adjusting knob, two screw bevel gears engaged with the bevel gear respectively and two thread hole bases disposed to be passed through by the additional driving screws at the time of the eye frames engaging with the driving screws, wherein the adjust adjusting knob is operated to adjust a distance between the eye frames.

6. The integrative spectacle-shaped stereoscopic video multimedia device according to claim 2, wherein the viewing module hole distance adjusting mechanism further comprises two driving screws engaging with the eye frames respectively, a bevel gear disposed on the adjusting knob, two screw bevel gears, engaged with the bevel gear respectively and two thread hole bases disposed to be passed through by the driving screws of the distance adjusting mechanism at the time of the eye frames engaging with the driving screws, wherein the adjust adjusting knob is operated to adjust a distance between the eye frames.

7. The integrative spectacle-shaped stereoscopic video multimedia device according to claim 5, wherein two lens slots are respectively disposed on the eye frames.

8. The integrative spectacle-shaped stereoscopic video multimedia device according to claim 6, wherein two lens slots are respectively disposed on the eye frames.

9. The integrative spectacle-shaped stereoscopic video multimedia device according to claim 1, further comprising a television program receiving unit which has television keys disposed on the blinder, forms a circuit connection with the binocular stereoscopic viewing module, the sound pickups, the loudspeakers, the memory, the signal interface, the analog/digital converters, and the processor.

10. The integrative spectacle-shaped stereoscopic video multimedia device according to claim 1, wherein the signal interface further comprises one or more analog signal interfaces, a digital signal interface, an infrared interface, a Bluetooth interface, a wireless fidelity (WiFi) interface, and an Ethernet interface, and the preceding interfaces match the process control software.

11. The integrative spectacle-shaped stereoscopic video multimedia device according to claim 9, wherein the signal interface further comprises one or more analog signal interfaces, a digital signal interface, an infrared interface, a Bluetooth interface, a wireless fidelity (WiFi) interface, and an Ethernet interface, and the preceding interfaces match the process control software.

12. The integrative spectacle-shaped stereoscopic video multimedia device according to claim 10, further comprising a fill light operated by the process control software.

13. The integrative spectacle-shaped stereoscopic video multimedia device according to claim 11, further comprising a fill light operated by the process control software.

14. The integrative spectacle-shaped stereoscopic video multimedia device according to claim 1, wherein the memory comprises a memory expansion slot.

15. The integrative spectacle-shaped stereoscopic video multimedia device according to claim 9, wherein the memory comprises a memory expansion slot.

16. The integrative spectacle-shaped stereoscopic video multimedia device according to claim 5, wherein two eye brackets are respectively disposed on the eye frames.

17. The integrative spectacle-shaped stereoscopic video multimedia device according to claim 6, wherein two eye bracket are respectively disposed on the eye frames.

* * * * *